Dec. 29, 1931.  W. W. WILLIAMS  1,838,974
INTERNAL COMBUSTION ENGINE
Filed Oct. 26, 1928  6 Sheets-Sheet 1

INVENTOR
WALTER W. WILLIAMS
BY
ATTORNEY

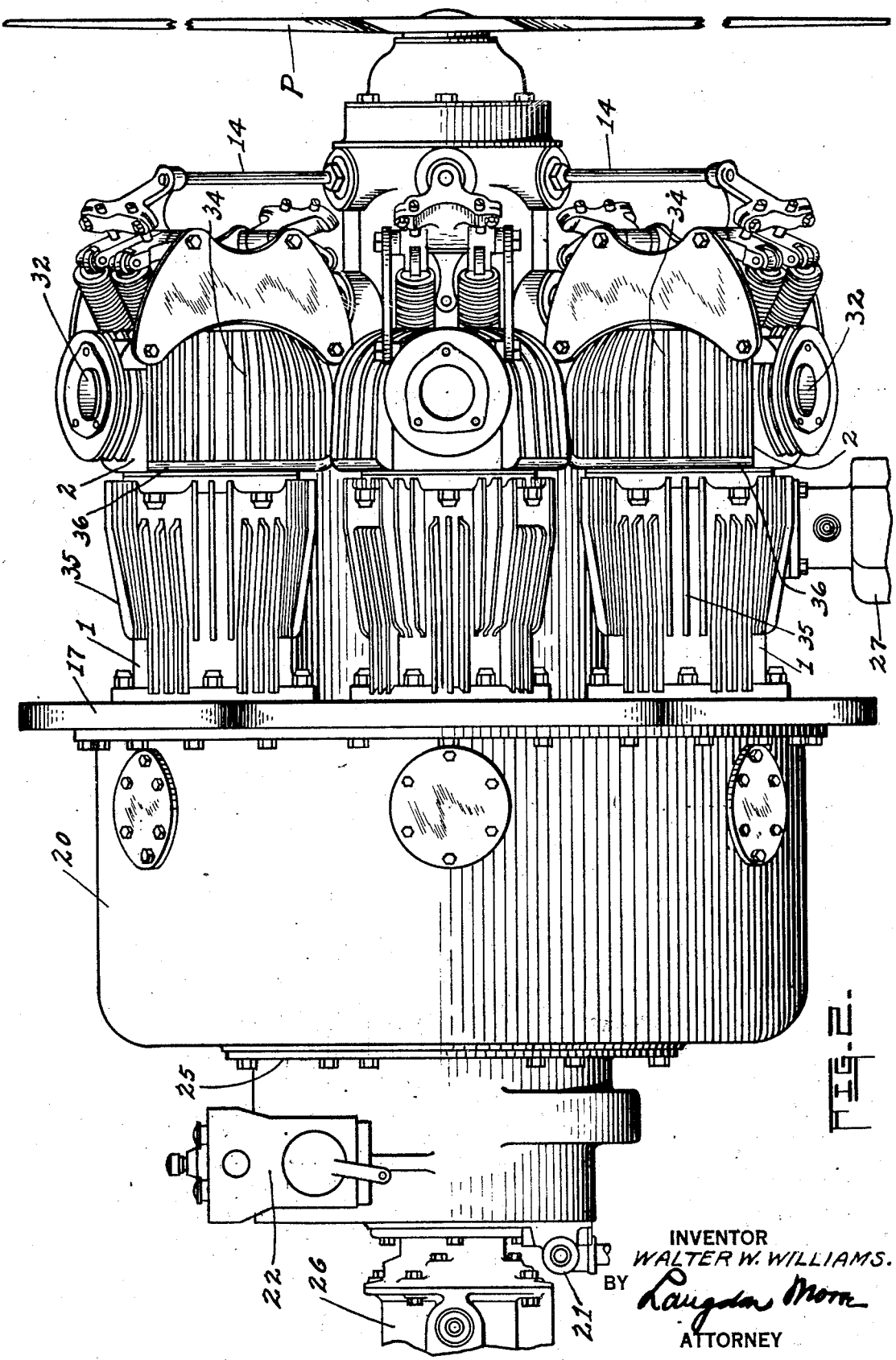

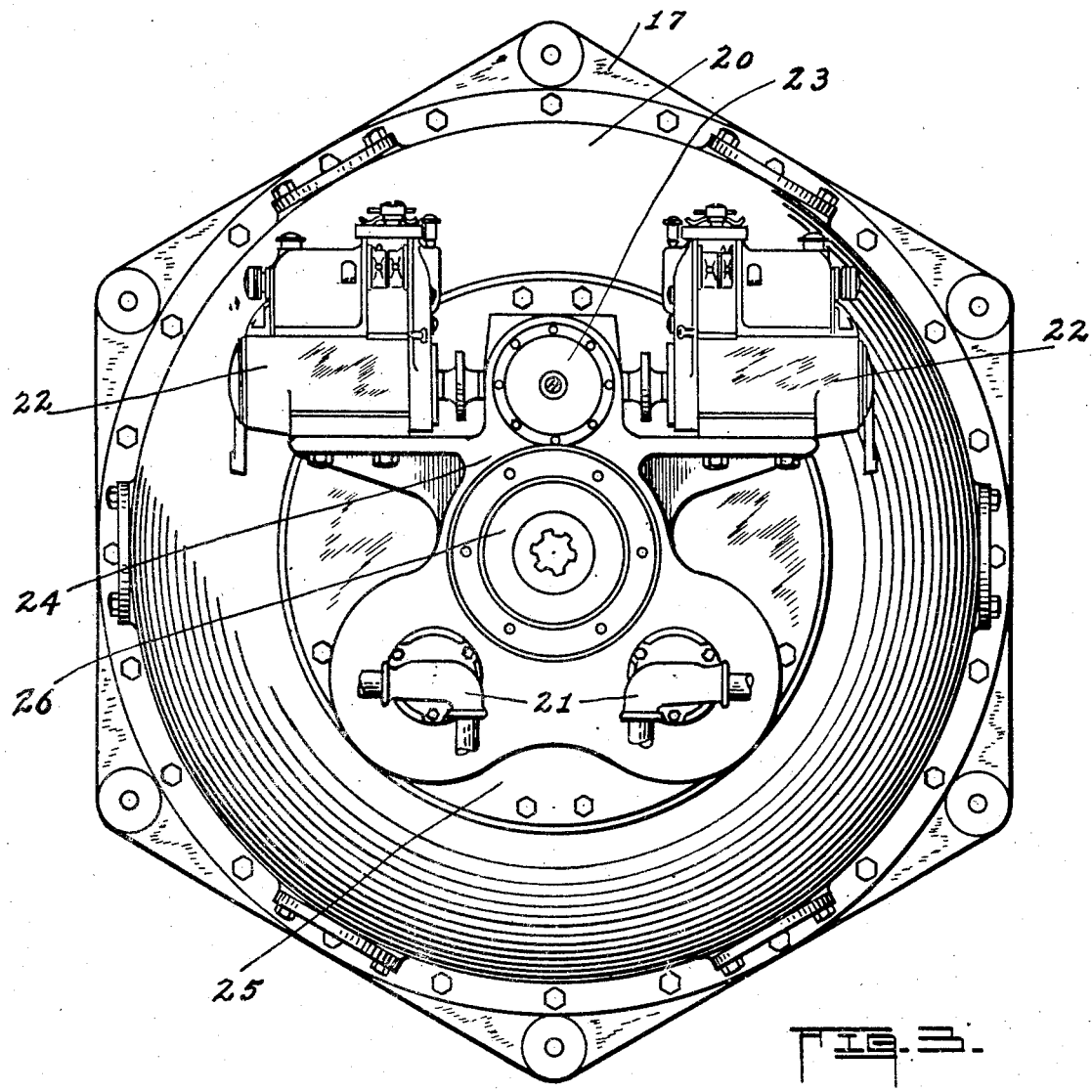

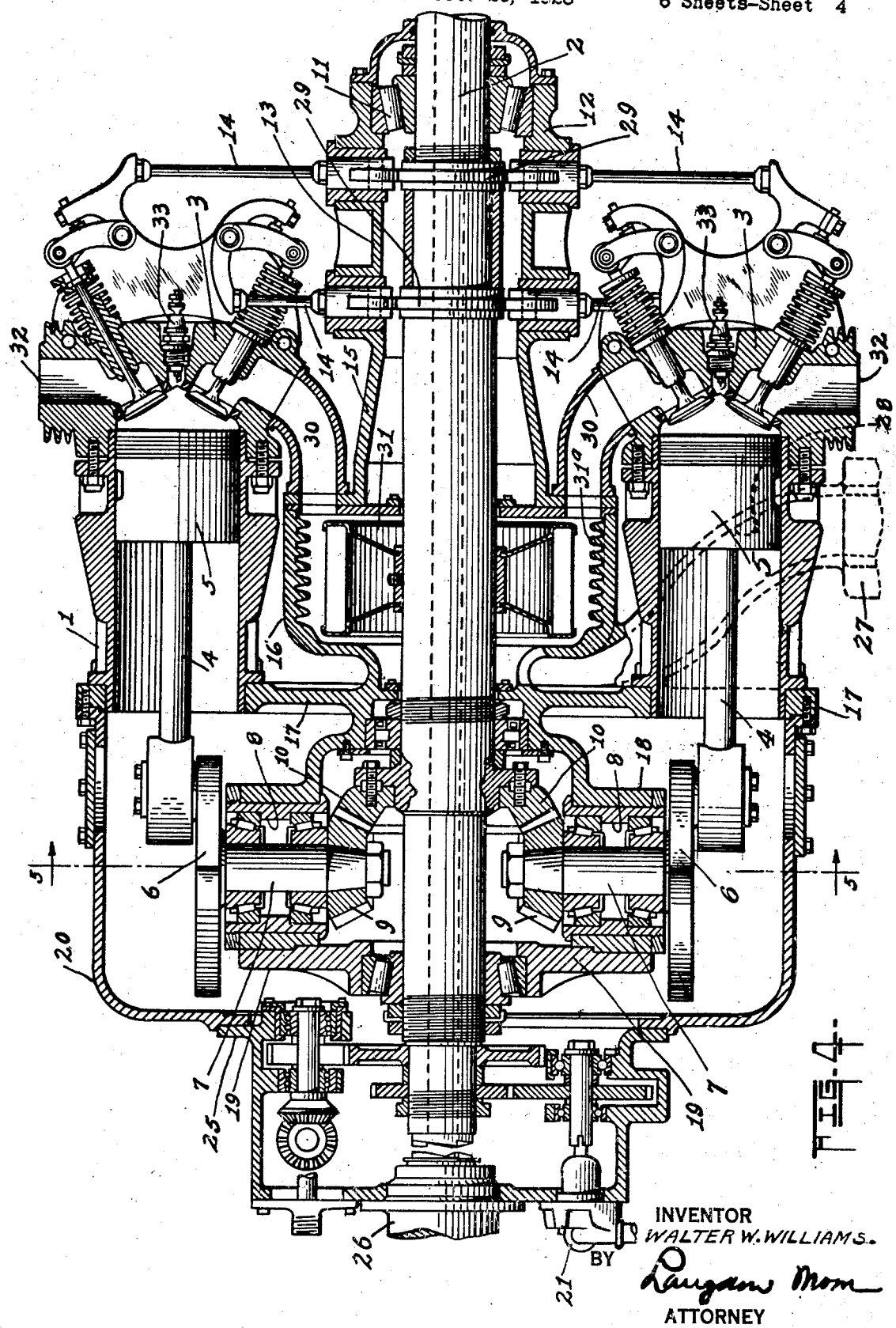

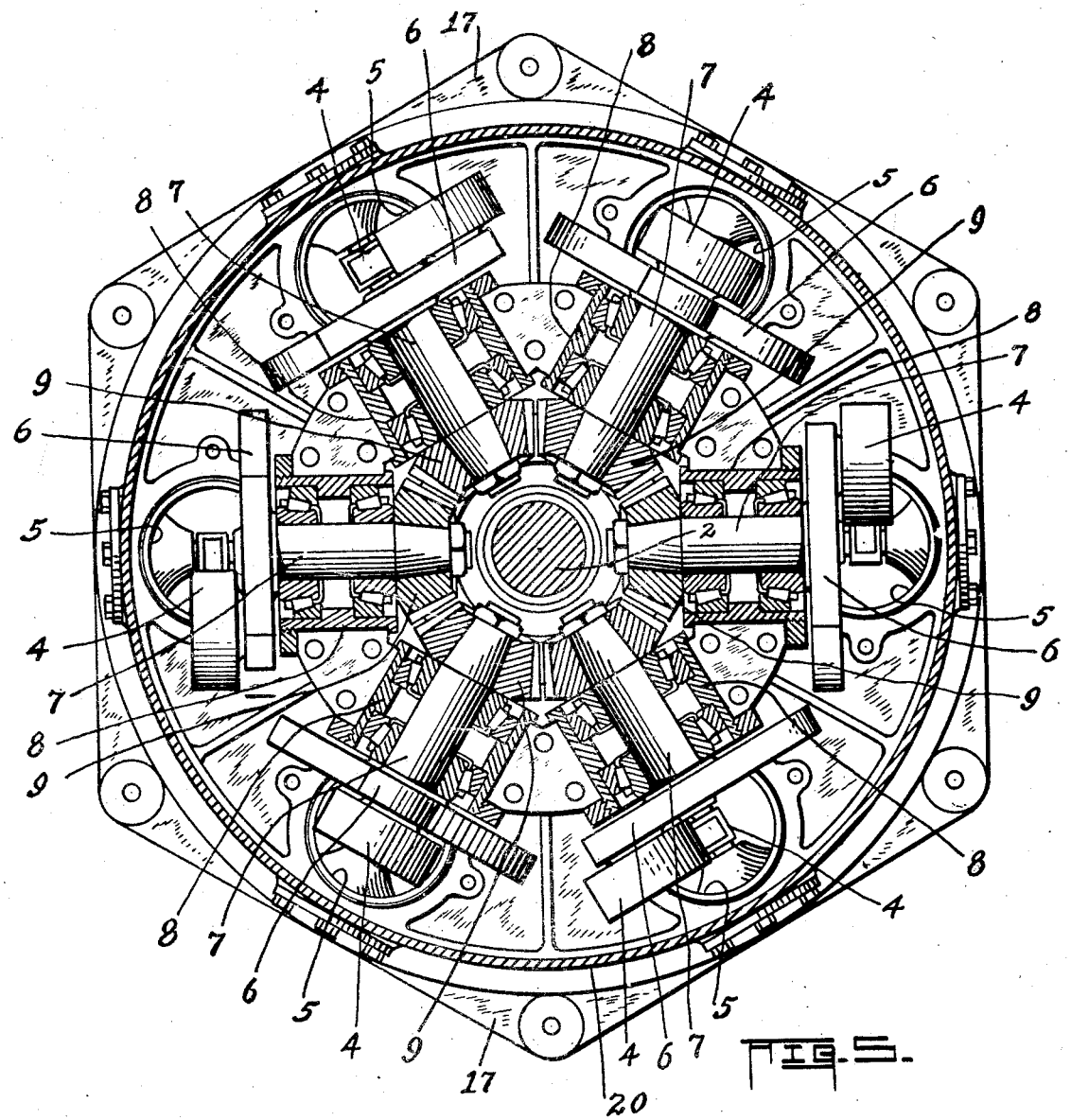

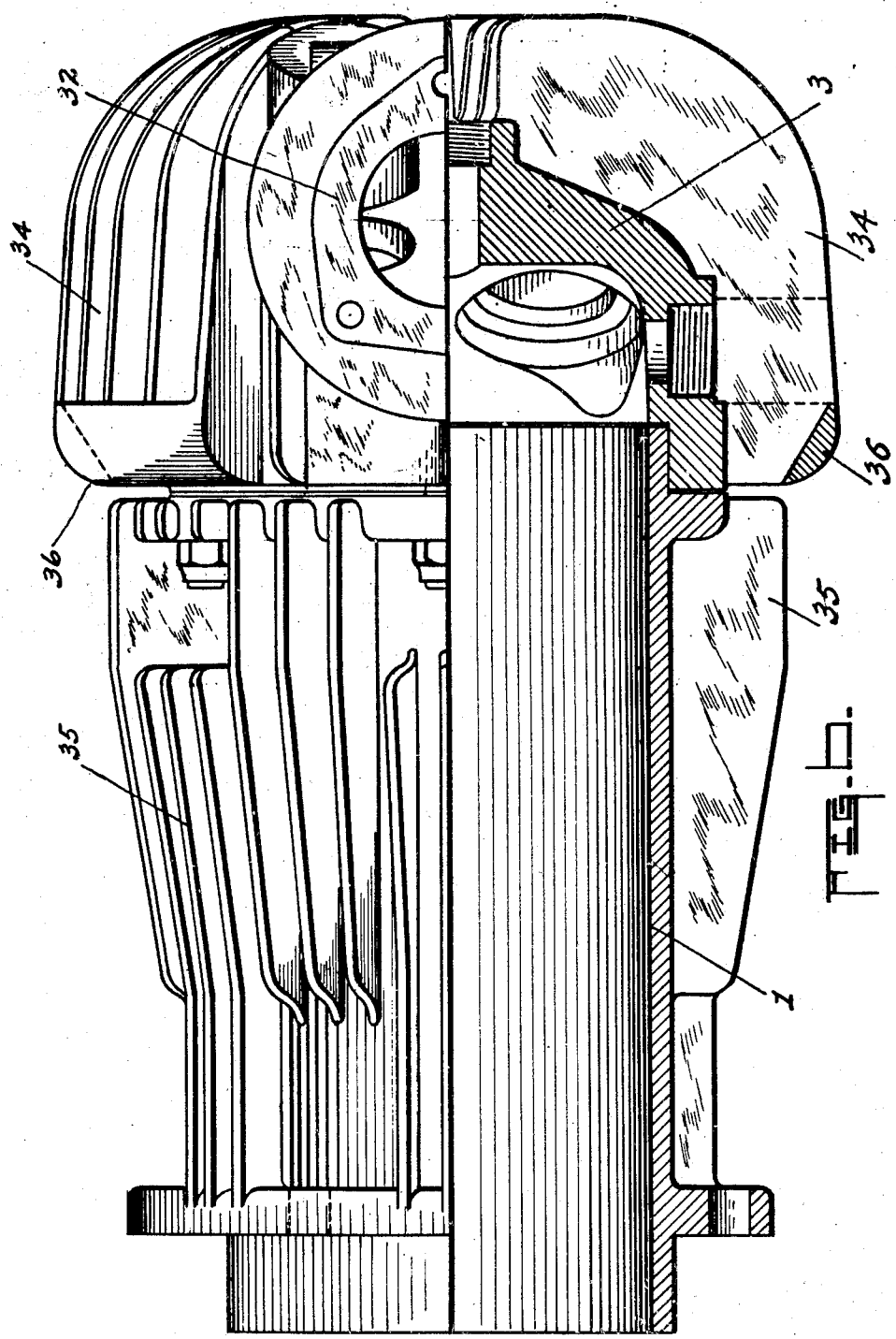

Patented Dec. 29, 1931

1,838,974

UNITED STATES PATENT OFFICE

WALTER W. WILLIAMS, OF BLOOMINGTON, ILLINOIS

INTERNAL COMBUSTION ENGINE

Application filed October 26, 1928. Serial No. 315,130.

This invention relates to improvements in internal combustion engines and more particularly to the type especially adapted for driving propellers of airplanes.

It is an object of this invenion to provide an engine of this type which will offer less wind resistance and present a greater cooling surface when in operation upon an airplane than the engines now customarily employed for that purpose. It is a further object of this invention to provide an engine of this type so constructed that the pistons may travel at a higher rate of speed than is customary in airplane engines and is so connected to the propeller drive shaft that the propeller will be driven at a lower speed than customarily driven by the airplane engine now in commercial use. The increasing of the speed at which the piston travels greatly increases the efficiency of the engine and the lower speed of the propeller shaft gives a greater propeller efficiency.

With these and other objects in view, reference is made to the accompanying sheets of drawings which illustrate a preferred form of this improved internal combustion engine, with the understanding that minor detail changes may be made without departing from the scope of the invention.

Figure 1 is a view in front elevation with the propeller removed and the propeller drive shaft shown in section.

Figure 2 is a view in side elevation of Figure 1, with the propeller diagrammatically indicated in position.

Figure 3 is a view in rear elevation of Figure 2 with parts broken away.

Figure 4 is a view in section taken on the line 4—4 of Figure 1, looking in the direction of the arrow.

Figure 5 is a view in transverse section taken on the line 5—5 of Figure 4 looking in the direction of the arrow.

Figure 6 is an enlarged detail view of one cylinder and cylinder head assembled partly in side elevation and partly in section.

Figure 7:
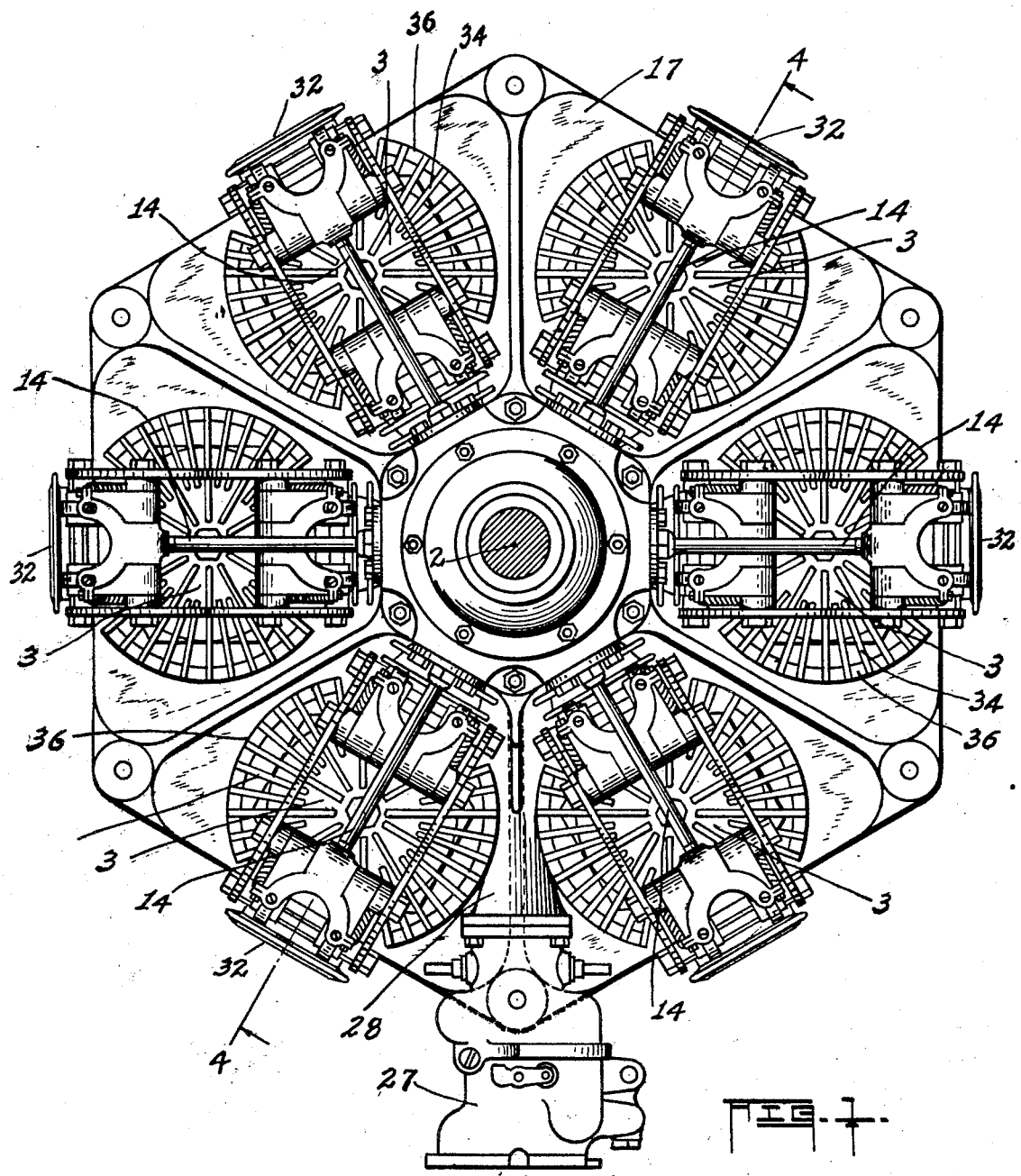

Figure 1 of the drawings, showing the complete engine in front elevation, illustrates the six cylinders 1 arranged symmetrically about the propeller drive shaft 2. By referring to Figures 2 and 4, it is seen that the engine cylinders are arranged with their heads 3 pointed in the direction of the propeller P and in this particular embodiment the center lines of the piston chambers of the respective cylinders are arranged parallel to each other and to the center line of the propeller drive shaft, however, it is to be understood that this particular arrangement may be departed from slightly without departing from the scope of this invention as long as the cylinder heads are pointed in the general direction of the propeller or in the direction of one end of the shaft driven by the engine.

Referring to Figures 4 and 5, it is seen that the connecting rod 4 of each piston 5 is connected to an individual crank 6 mounted upon an individual crank shaft 7. The respective crank shafts 7 are mounted in bearings 8 symmetrically arranged about the center of the propeller drive shaft 2 and the ends of each crank shaft below its respective bearing mounts a bevel pinion 9 keyed thereon, adapted to engage a bevel driving gear 10 rigidly connected to the propeller drive shaft 2. In the preferred construction as shown the back-gearing between the engine and the propeller drive shaft, as illustrated, is a two-to-one reduction gear which permits the propeller to be driven at a lower speed than is customary and at the same time allows the pistons of the engine to travel at a higher rate of speed than is customary thereby greatly increasing the efficiency of the propeller and at the same time increasing the efficiency of the engine. It also allows the forward part of the propeller shaft to be utilized as the cam shaft since this shaft revolves at one half the speed of each of the six crank shafts. This particular construction allows the valves of all six cylinders to be operated by only two cams which are secured directly or to the propeller shaft, as shown on Figure 4. It is also clearly shown on Figure 4 that the propeller shaft is also utilized to drive the various accessories necessary to an engine of this design, such as magnetos, oil pumps, tachometer, intake impeller, and both the inlet and exhaust cams.

The forward portion of the propeller drive shaft 2 is mounted in a bearing 11 contained within a housing 12 at the rear of the propeller, which housing is secured to the housing 13 which mounts the reciprocating valve operating tappets 14 for the respective engine cylinders 1 and this housing is secured to a casing 15 passing between the cylinder heads 3 which is secured to a cylindrical casing 16 concentric with the propeller shaft 2, extending between the inner sides of the respective engine cylinders 1, which casing is preferably formed integral with a hexagonal base plate 17 concentric with the propeller drive shaft and arranged in a plane at right angle thereto, and, inasmuch as this plate corresponds in function to the usual main crank case, it may be termed the main crank case in this construction. In this preferred form, the forward half of the housings 18 for the respective crank shaft bearings 8 are formed integral with and supported upon the rear of the main crank case 17. The rear halves of said housing are secured to the forward halves in the customary manner and the rear surface of said rear halves are respectively secured to a rear bearing support 19 mounting bearings for the rear end of the propeller drive shaft 2. The entire back gearing including the rear propeller drive shaft bearings is enclosed by a cylindrical crank case cover 20 secured to the rear side of the main crank case. Upon the propeller drive shaft to the rear of the rear bearings thereof gears are mounted for driving the oil pumps 21, the magneto 22 and the tachometer 23 which, together with their transmission gears and bearings are mounted upon supports 24 therefor carried on a closure plate 25 which is secured to the rear surface of the crank case cover 20, as shown in Figures 3, 4, and 5. Figures 2 and 4 also illustrate a conventional type of engine starter 26 with means for connecting the same to the propeller drive shaft, if so desired.

Figures 1 and 2 indicate a conventional type of carburetor 27 positioned between the two lowermost engine cylinders. Figure 4 illustrates a connection 28 between the carburetor and the underside of the cylindrical casing 16 extending forward from the main crank case between the respective engine cylinders. In this particular type of engine it is preferable to provide each cylinder head with double intake and exhaust valves with each respective pair operating in unison through reciprocating valve tappets 14 cooperating with cams 29 mounted upon the propeller drive shaft 2. Stuffing boxes are provided about the propeller drive shaft 2 on each side of the cylindrical casing 16 which communicates with the carburetor 27. The forward side of the closure of this casing 16 is provided with passage ways 30 leading to each pair of intake valves on each respective cylinder head and, as its function is the same as the customary intake manifold, it may be so termed here. A fan 31 is mounted within the cylindrical manifold casing 16 communicating with a carburetor and intake ports upon the propeller drive shaft 2 which will rotate therewith and insure a constant flow of mixture from the carburetor to the respective cylinder heads 3, and to prevent a swirling motion being imparted to the impelled mixture, a series of serrated baffles 31ª are arranged, preferably integral with the manifold casing 16, to project inwardly and parallel to each other between each pair of intake passages 30. It is to be noted that the intake valves are arranged on that portion of the cylinder heads adjacent the propeller drive shaft and that the exhaust ports 32 open to the atmosphere from the outermost portion of the cylinder heads.

The cylinder heads 3 are mounted upon the cylinders 1 in the manner shown in Figure 4, and are secured thereto by cylinder head bolts passing through an outstanding flange upon the upper portion of the cylinder. The rear portions of each cylinder pass through apertures provided therefore in the main crank case 17 and are secured thereto in the usual manner by crank case bolts passing through outstanding flanges upon the cylinder. Spark plugs 33 are provided in each cylinder head midway between the respective intake and exhaust valves in the customary manner and, inasmuch as the ignition system for this engine does not differ from the customary ignition for such engines, the spark plugs and wiring therefor are not illustrated.

Each cylinder head 3 is provided with a plurality of spaced apart radial cooling fins 34, as shown in detail in Figure 6, and each cylinder is provided with a similar number of radial cooling fins 35 arranged in continuation of the fins 34 of the cylinder head. In order that a continuous current of air will travel between the fins upon the cylinder head and continuing fins upon the cylinder, the cylinder head fins between the intake and exhaust ports are connected at their outer edges adjacent the cylinder by an angularly positioned fin 36 preferably formed integral therewith, as more particularly shown in Figure 6, so that when this engine is installed on an airplane and same is traveling through the air, the air current traveling between the fins 34 on the cylinder head will be deflected by the angularly arranged connecting fins 36 to the cylinder wall behind the cylinder head connecting flange and continue along the cylinder between the cylinder fins 35.

When it is desired to use a different ratio of back-gearing than the two-to-one reduction gear shown and described, a separate and distinct reduction gearing will be provided for the rotation of the valve tappet cams.

What I claim is:

In an air cooled internal combustion engine for aeroplane propulsion, a propeller shaft adapted to be driven thereby, a plurality of uncovered cylinders arranged about said shaft with their respective axes parallel to said shaft, each cylinder provided with a dome shaped removable head having a plurality of outstanding radial cooling fins diverging from the center of the dome to the base, said fins joined at the base by a transverse angularly disposed connecting fin spaced apart from the head, and each cylinder having a corresponding number of longitudinally disposed radial cooling fins of lesser expanse and alined with the fins on the head, reciprocating pistons and connecting rods therefrom in each cylinder, a crank shaft adapted to be rotated thereby, and a power transmission means between said crank shaft and said propeller shaft.

Signed at Bloomington, Illinois, this 24th day of October, 1928.

WALTER W. WILLIAMS.